(No Model.) 7 Sheets—Sheet 1.
W. H. & W. W. WYTHE.
CASH REGISTER AND INDICATOR.
No. 445,582. Patented Feb. 3, 1891.
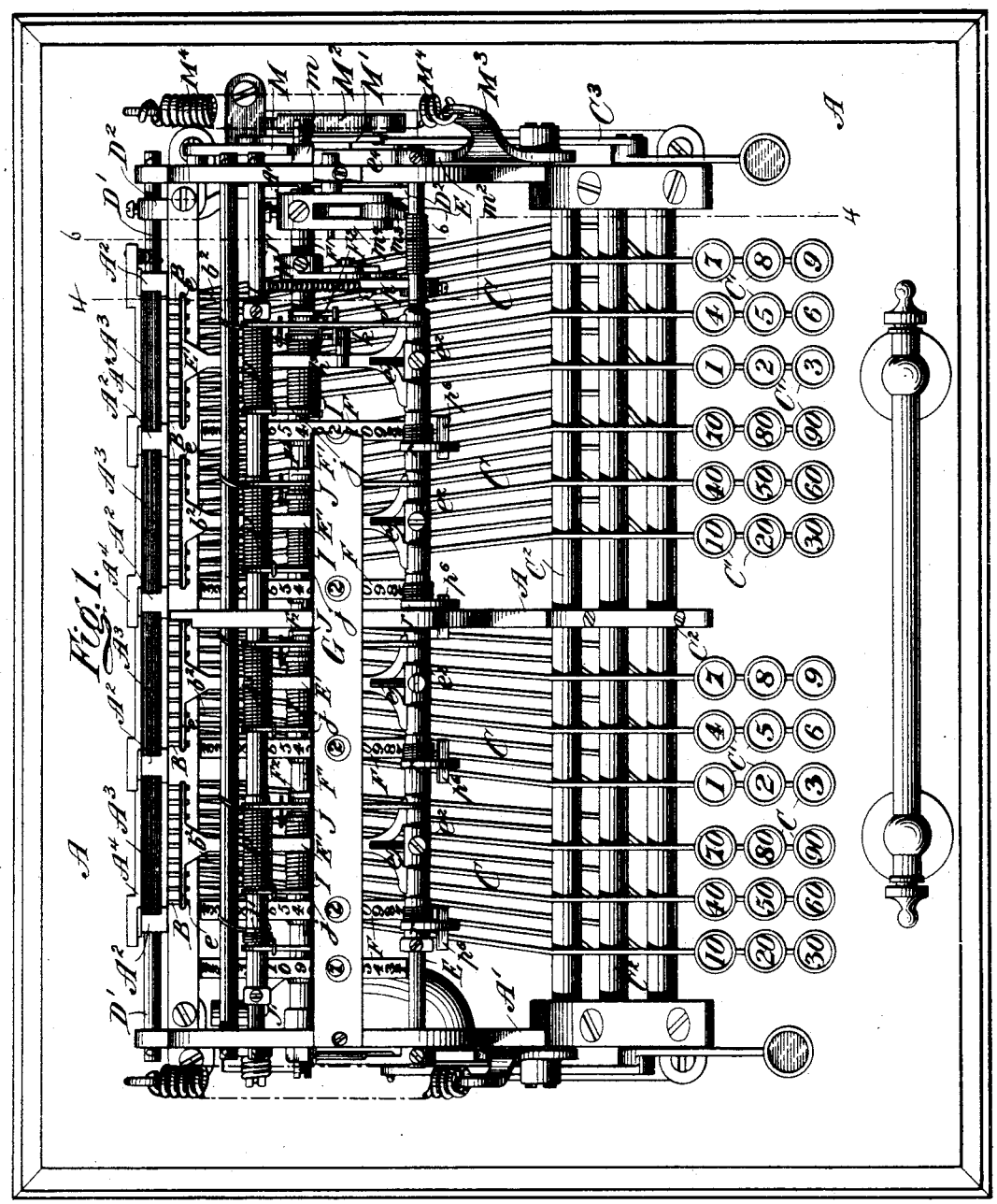

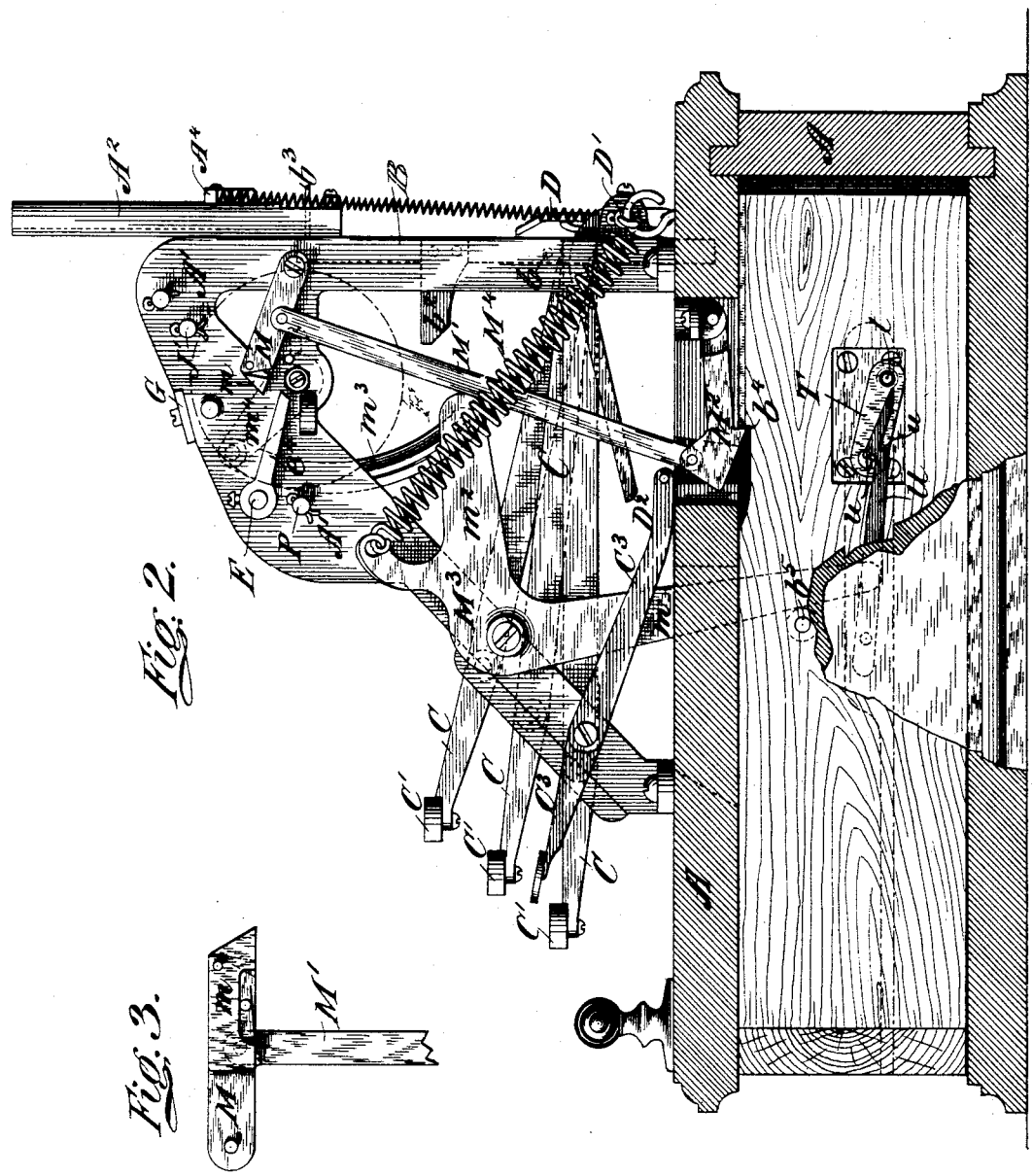

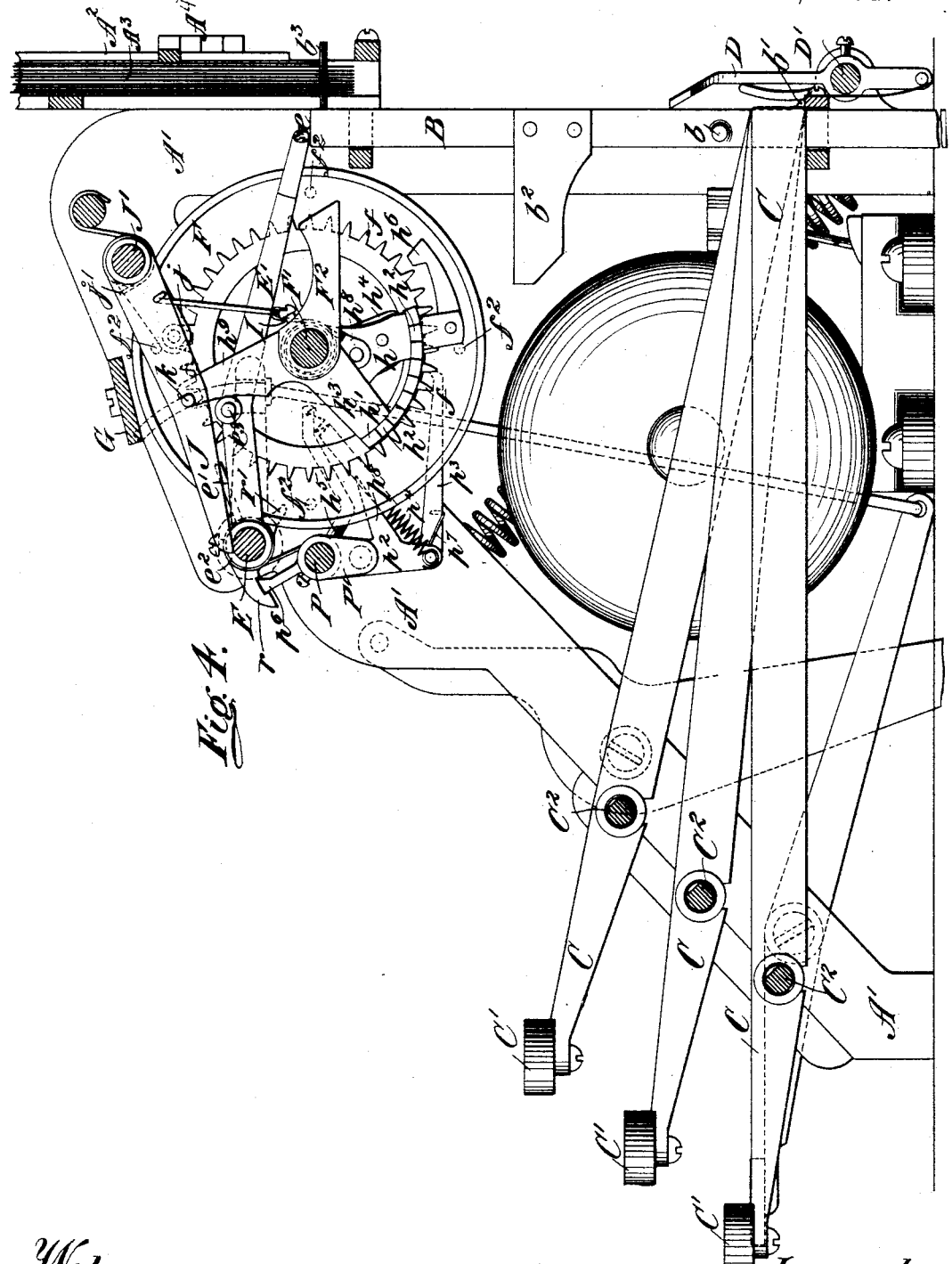

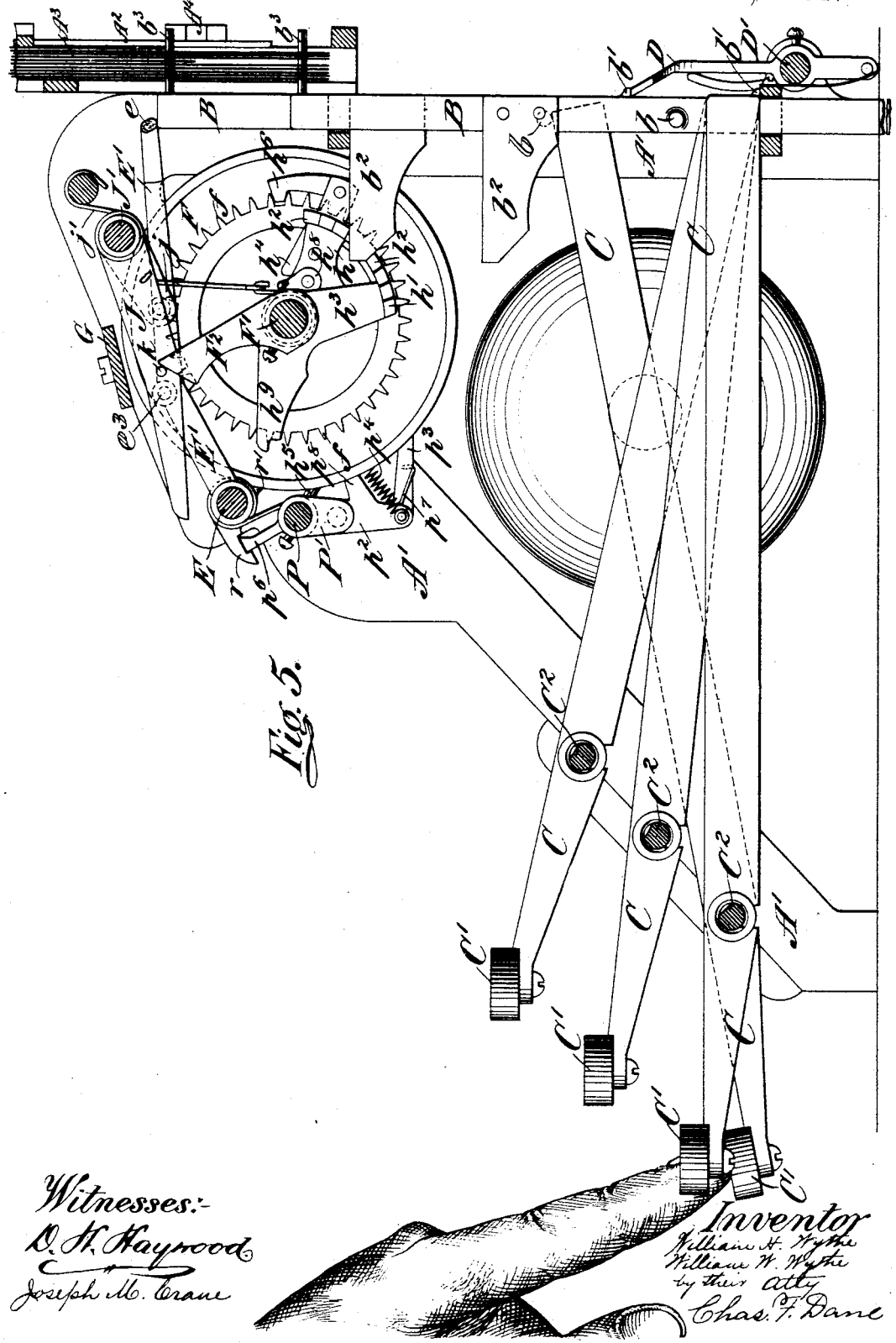

(No Model.) 7 Sheets—Sheet 5.
W. H. & W. W. WYTHE.
CASH REGISTER AND INDICATOR.
No. 445,582. Patented Feb. 3, 1891.
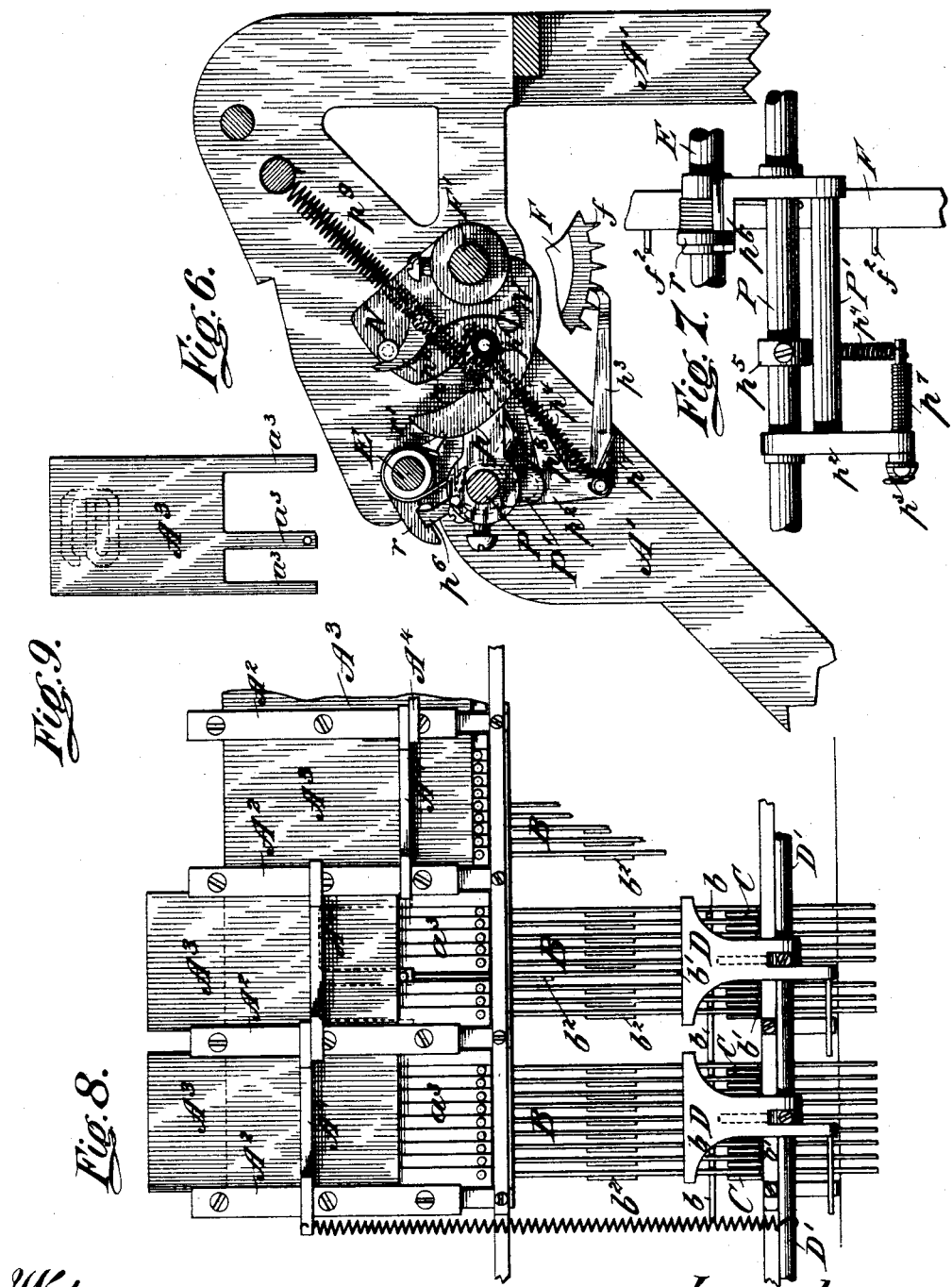
Witnesses:-
D. H. Haywood
Joseph M. Crane
Inventor.-
William H. Wythe
William W. Wythe
by their Atty
Chas. F. Dane (No Model.) 7 Sheets—Sheet 6.

W. H. & W. W. WYTHE.
CASH REGISTER AND INDICATOR.

No. 445,582. Patented Feb. 3, 1891.

Witnesses:—
D. H. Haywood
Joseph M. Crane

Inventor.—
William H. Wythe
William W. Wythe
by their Atty
Chas. F. Dane (No Model.)  W. H. & W. W. WYTHE.  7 Sheets—Sheet 7.
CASH REGISTER AND INDICATOR.

No. 445,582.  Patented Feb. 3, 1891.

Witnesses:-
O. H. Haywood
Joseph M. Crane

Inventor.-
William H. Wythe
William W. Wythe
by their Atty
Chas. F. Dane

UNITED STATES PATENT OFFICE.

WILLIAM H. WYTHE AND WILLIAM W. WYTHE, OF EAST ORANGE, NEW JERSEY.

CASH REGISTER AND INDICATOR.

SPECIFICATION forming part of Letters Patent No. 445,582, dated February 3, 1891.

Application filed October 16, 1889. Serial No. 327,598. (No model.)

*To all whom it may concern:*

Be it known that we, WILLIAM H. WYTHE and WILLIAM W. WYTHE, citizens of the United States, residing at East Orange, Essex county, and State of New Jersey, have invented new and useful Improvements in Cash Registers and Indicators, of which the following, taken in connection with the accompanying drawings, forms the specification.

Our invention relates to that class of instruments more especially applicable for use in stores, &c., where buying and selling takes place, and whereby the amount of the purchase or otherwise may be disclosed to the view of the buyer through suitably-arranged openings by means of tablets or plates provided with numerals or other suitable characters thereon, which are raised to view through the medium of suitable mechanism by means of keys in a manner as will hereinafter be set forth, and the amount of the sales thus indicated may be disclosed at any time by reference, in this instance, to the interior of the case, wherein, by means of suitable mechanism, the addition of the different amounts is carried on and the sum total disclosed through suitably-arranged openings; and the invention consists more particularly in the new arrangement and construction of parts, whereby the action of the same is more positive and simple than in those heretofore used and the cost of producing the same is correspondingly reduced.

Figure 13:
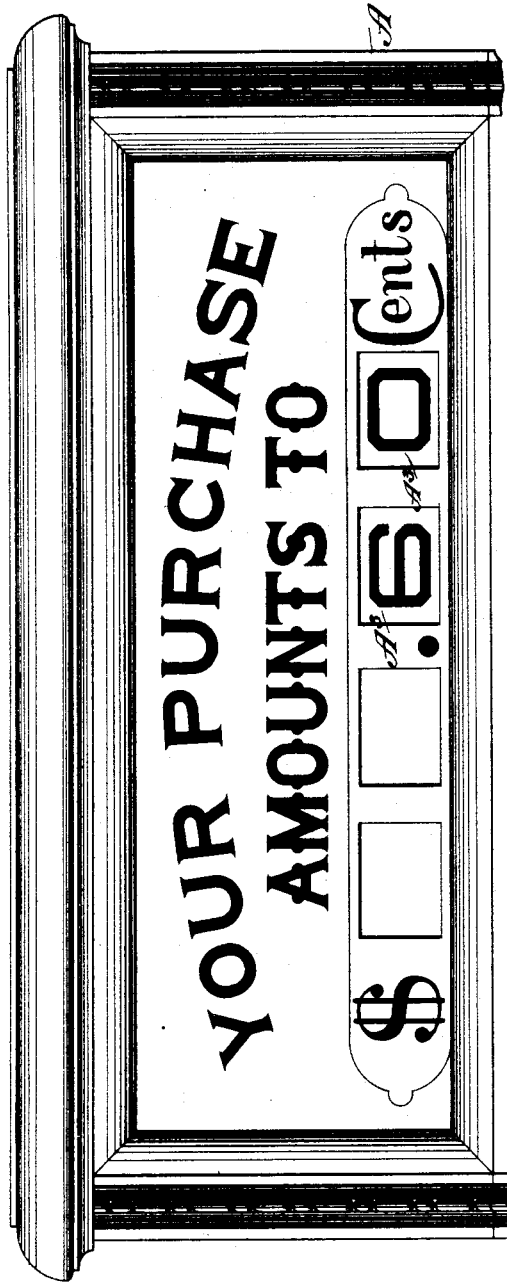
Figure 12:
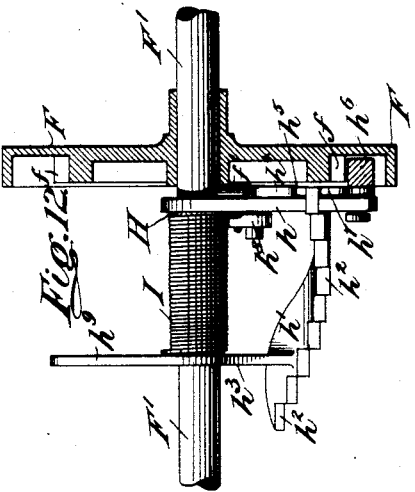
Figure 11:
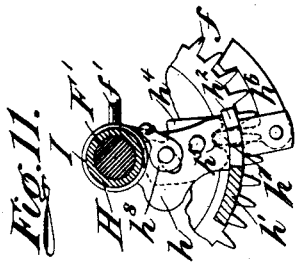
Figure 10:
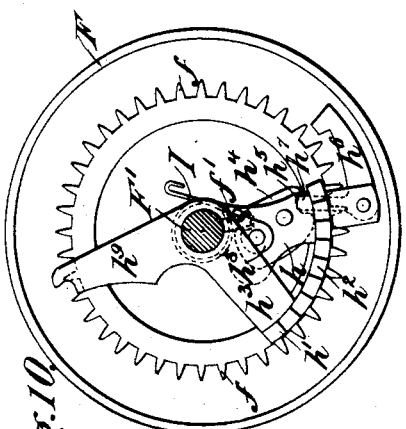

Referring to the drawings, Figure 1 represents a top plan view of our improved machine with the outer case or covering removed; Fig. 2, an end or side view of the same showing the drawer operating mechanism and its case partly in section; Fig. 3, a detail view of one of the operating parts, to be referred to hereinafter; Fig. 4, a vertical sectional view of the machine through line 4 4 of Fig. 1, showing the several operating parts in a normal position, and Fig. 5 a view of the same showing the position of the said several operating parts at the depression of one of the key-levers, as shown; Fig. 6, a vertical sectional view through line 6 6 of Fig. 1, showing the segment and groove therein for operating the carrying mechanism; Fig. 7, a front view in detail of a frame or support forming a part of the "carrying mechanism," so called; Fig. 8, a rear view of a section of the machine, showing two of the indicating-plates raised; Fig. 9, a detail view of one of the indicating plates or tablets; Figs. 10, 11, and 12, detail views of one of the registering-wheels with a part of its actuating mechanism; Fig. 13, a view showing the upper or that portion of the case containing the openings through which the amount of purchase is disclosed; and Fig. 14, a modification to be hereinafter described.

To describe in detail, A represents that part of the case containing the opening for the drawer, and upon which, in the instance shown, a frame A' is secured for the support of the several different parts forming the operating mechanism or otherwise, the case or covering for the said mechanism being omitted in the drawings, with the exception of the upper part, which is clearly shown in Fig. 13. In the rear of the said frame A' and secured thereto is a secondary frame or case $A^2$, as more clearly shown in Figs. 1 and 8, in which the indicating plates or tablets (represented at $A^3$) are loosely supported and allowed to slide or operate vertically therein when operated by means and in a manner as will hereinafter be set forth. Said indicating plates or tablets, in the instance shown, consist of four series, arranged side by side in their frame $A^2$, as clearly shown, each series consisting of ten plates or tablets arranged one behind the other and numbered from 0 to 9, the zero-tablet being at the rear of the series and the unit-tablet at the front or nearest to that part of the case containing the openings through which the indicating characters or numerals are exposed, and which part or section of the case is clearly shown in Fig. 13, the same being provided with four openings therein, with a decimal-point arranged between the central openings to represent dollars on one side and cents on the other to enable the amount so exposed to be readily understood. The said indicating plates or tablets $A^3$ (a detail view of one of which is clearly shown in Fig. 9) are each (with the exception of the zero-tablet) provided with arms $a^3$, one of which is attached to the supporting-rod B and the others adapted to assist in guiding the tablet when operated, the arms of each tablet overlapping those of the others in the same series for mutual support, as more clearly shown in Fig. 8 and as will be readily understood by those skilled in the art.

The zero-tablets are not provided with any arms, but are as long as the length of the other tablets and their supporting-arms and have no positive connection with any operating parts, but rest loosely upon projections $b^3$, located at or near the upper end of the said tablet-supporting rods B in a manner to be operated or raised by the latter when any one of the indicating-tablets of the same series is raised; but the same does not show, owing to its location behind the latter, the pin $b^3$ passing between the arms $a^3$ of the front tablets. When, however, any one of the tablets left of the extreme right-hand series is raised, the zero-tablet belonging to the series of the tablet raised is elevated, and those to the right of the same, by means of lifting-arms, (represented at $A^4$ in Fig. 8,) which are secured to the rear side of said zero-plates, the end of each arm projecting beneath that of the next succeeding one, the lowest one being located on the dollar-tablet at the left of the case. Thus in case the key 10 of the dollar series is depressed the tablet provided with the dollar-numeral 1 would be raised and also the zero-tablet behind the same, which latter would raise all of the zero-tablets to the right of the same by means of the lifting-arm $A^4$, as will be readily understood, and presenting to the observer the sum as follows: $10.00. The said rods B, which support at their upper ends the indicating plates or tablets $A^3$, as described, are loosely supported at their upper and lower ends in openings in the frame A', as more clearly shown in Figs. 4 and 5, and are adapted to be raised or operated by means of key-levers C, which are arranged, in the instance shown, in three rows detachably fulcrumed on shaft $C^2$, which extend across the front of the frame A', as clearly shown in Figs. 1, 4, and 5. Said key-levers at their fulcrum point on the shafts $C^2$ are provided with a circular opening, as more clearly shown in Figs. 4 and 5, for the reception of the shafts $C^2$, and which openings are cut away on their lower side, forming an opening or slot slightly smaller in diameter than the said circular openings to prevent the key-levers from being detached from their shaft when the latter is in a normal position, and said shafts $C^2$ are cut away on one side, forming a flat face, as clearly shown, sufficient to make the diameter of said shaft at a point through its narrowest part formed by the face equal to that opening or slot in said key-levers communicating with the circular opening therein in a manner that when the shafts $C^2$ are rotated to bring the face thereon vertical with the lower opening or slot in the key-lever the latter are enabled to be raised or detached from their said supporting-shaft, as will appear obvious to those skilled in the art. By this means one or more of the key-levers may be detached or replaced without interfering with the others in case of breakage or other damage to the same, the said levers being provided at their front ends with keys C', secured thereto, said keys being arranged in two series numbered from 1 to 90, those at the left of the center adapted for operating the dollar-indicating tablets and those at the right representing the cents-indicating tablets, as shown in Fig. 1.

The operation and manner of operating the tablets by means of the numbered keys to produce the different sums will be described in detail hereinafter. Said key-levers at their opposite or rear ends are adapted to engage projections $b$ on the tablet-supporting rod B to raise the latter, and thereby the tablet supported thereon, and when thus elevated to the proper height to expose the numerals on the tablets the same are held stationary in said raised position by one of the pawls D, loosely journaled on the shaft D', which engages a projection $b'$, located on the rear side of said supporting-rods B, as clearly shown in Figs. 5 and 8, the upper free ends of said pawls being held in contact with the rear side of the rods B to engage the projections thereon, when raised, by means of a spring bearing with an outward pressure upon its lower free end, as more clearly shown in Fig. 5, and to release said rod or rods B from their raised position (after the closing of the drawer) I provide a blank key-lever $C^3$, (see Fig. 2,) adapted to engage at its free end with an arm $D^2$ of the pawl-supporting shaft D' to rotate the latter backward and cause pins or projections located thereon (see Fig. 5) to engage with and release the pawl or pawls from their engagement with the projections $b$ on the rods B to allow the latter and the tablet supported thereon to drop back to their normal position. Whenever any of the key-levers are depressed to elevate the indicating-tablets, the top of the rod B, supporting the elevated tablet, engages with and raises a transverse bar $e$, resting loosely on top of the series, (more clearly shown in Figs. 1, 4, and 5,) and which is located on the end of an arm E', loosely journaled on a shaft E, and when said arm E' is thus raised it engages a pin or projection $e'$, extending from a set-collar $e^2$, secured on the shaft E, (see Fig. 1,) and raises the same, thereby rotating the said shaft to operate the drawer-operating mechanism, (which is more clearly shown in Fig. 2,) in a manner as will be hereinafter described. The said pins or projections $e'$ on the shaft E, by the contact with which of the arms E' the said shaft E is operated, are adjustable thereon by means of their collars to allow for undue wear by friction or otherwise, and also to adjust the throw of the shaft E and the connecting mechanism, as will appear obvious.

F represents a series of wheels or disks loosely journaled on a shaft F', extending longitudinally across and supported by the frame A', and are provided on their outer circumference with four series of figures equally arranged as to space thereon, each series consisting of the figures from 0 to 9, and by means of which numbered wheels or disks the registering of the different amounts exposed through the openings in the upper part of the instrument are carried on by mechanism, as will be set forth. A plate G extends across the frame A', provided with openings therein, immediately above the said wheels, through which the amounts of the registrations are exposed, and said registering wheels or disks are provided on one side thereof with teeth or serrations $f$, corresponding in number to the numbers or figures on their outer circumference. Loosely journaled on said shaft F' at one side of the registering-wheels are sleeves or collars H, (see Figs. 10, 11, and 12,) provided with an arm $h$ on the end adjacent to the corresponding wheel, extending at right angles therefrom, and from the lower end of which extends at an oblique angle and curving slightly upward an arm $h'$, the form of which (being essentially helical) is clearly shown in Fig. 12, which arm we term a "quadrant," and which is provided on its outer edge, or that edge adjacent to the tablet-supporting rods B, with notches $h^2$ therein, corresponding in number to the tablet-supporting rods of each series and located immediately in front of the same, each succeeding notch on said quadrant, beginning with the one adjacent to the wheel, being at a greater distance from the tablet-supporting rods B or an arm $b^2$ thereon (the end of which latter arm engages with the said notches, as will be hereinafter described) than the preceding notch, and the distance between each notch and its engaging-arm $b^2$ and that of the succeeding or preceding one being equal to the space between the numbers or figures on the outer periphery of the registering-wheel. For example, to register a six-cent sale the key of the cents series provided with the number 6 is depressed, thereby raising a correspondingly-numbered tablet, and through the medium of mechanism, as will hereinafter be described, the quadrant is released from a locked position and moved or rotated toward the rods B, carrying the registering-wheel, until engaged by the arms $b^2$ of the raised tablet-supporting rod B, which rod, being the sixth one in order from the first, engages the sixth notch in the quadrant, as shown in Fig. 5, thus allowing the registering-wheel to be carried forward six spaces, the required distance, as will appear obvious to those skilled in the art. Said quadrant at or near its opposite or outer end is supported by an arm $h^3$, extending from the said sleeve or collar H. To the inner or that side adjacent to the wheel of said arm $h$ is pivoted a plate $h^4$, which at its lower end is provided with a notch $h^5$ therein, adapted to engage with an arm or shank $h^7$ of a pawl $h^6$, which is pivoted to the arm $h$ and adapted at its free end to engage with the teeth $f$ of the registering-wheels to operate the latter. Normally the said pawl is held from engagement with the teeth of the registering-wheels by means of a pin $f'$, located on the shaft F', which pin or projection, when the shaft is in its normal position and the quadrant in its locked position, engages the upper part of the pivoted plate $h^4$, which latter plate acts upon the shank of the pawl $h^6$ to keep the latter disengaged from the teeth of the registering-wheels, as shown in Fig. 10. I represents a coiled spring located on the said sleeve or collar H, and is attached at one end to the said pivoted plate $h^4$ by means of a connecting pivoted device or plate $h^8$, as more clearly shown in Figs. 10, 11, and 12, although it is obvious the same may be connected directly thereto, and at its opposite end is attached to an arm J, extending from a sleeve loosely journaled on the shaft J', adapted to hold a pin or projection $k$, located on said arm, in engagement with a notch or recess located in the upper end of an arm or extension $h^9$ of the quadrant-supporting arm $h^3$ (see Figs. 4 and 10) to hold the said quadrant in a locked position. The action of the spring I, attached, as described, to the pivoted plate $h^4$. tends to exert a tension on the same, and thereby the quadrant (the latter being supported at one end by the said plate-supporting arm $h$,) in a direction toward the tablet-supporting rods B, for the purpose as will appear obvious, and the said pin or projection $k$ on the arm J, engaging the notch or recess in the extension $h^9$ of the quadrant-supporting arm $h^3$, as described, serves to hold the collar or sleeve H and the several operating parts attached thereto stationary. The said notched arms or extensions $h^9$ are also locked in their normal position, in addition to the means already described, by means of a pin or projection $e^3$, provided in the instance shown with a friction-roller thereon, located on the said arms E', (see Figs. 4 and 5,) and which extends in front of the said arms or extensions $h^9$ to act as a double lock for the same, for the purpose as will hereinafter be set forth.

Secured in a fixed position on the shaft F' are "releasing-arms," so-called, F², which, when the said shaft is in a normal position, are horizontal, or nearly so, as shown in Fig. 4; but when the said shaft is rotated (in a manner to be hereinafter described) said releasing-arms engage the pin $k$ on the arms J (shown in Fig. 5) and raise the same from engagement with the notched arm or extension $h^9$, (the same having already been released from contact with the engaging projection $e^3$, as will hereinafter be described,) thus releasing the latter and allowing the quadrant to be carried forward by the action of the spring I until engaged by the arm or projection $b^2$ on the raised tablet-supporting rod B, and at the same time the quadrant is thus released the backward rotation of the shaft F' moves the pin $f'$ thereon from engagement with the pivoted plate $h^4$, and the action of the said spring I on the pivoted plate $h^4$ brings the pawl $h^6$ into engagement with the teeth of the registering-wheel and moves the same forward simultaneously with the forward action of the quadrant.

Figure 14:
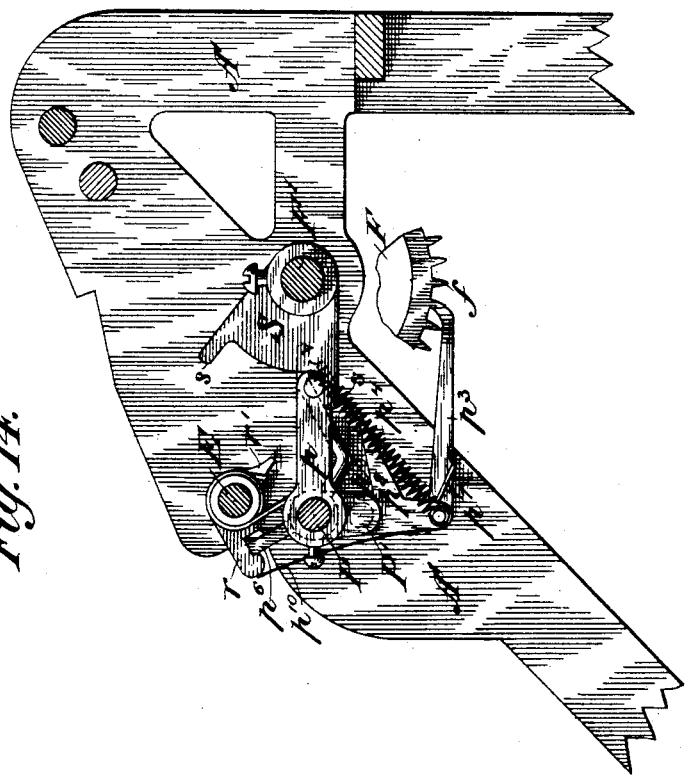

Just prior to the release of the notched arm $h^9$ from the pin $k$ (caused by the raising of the arm J, as described) the said pin or roller $e^3$, engaging its front edge thereof and located on the said arm E', is raised from engagement with the same (when one of the keys is depressed) by the elevating of the arm E' in a manner as hereinbefore described, and the raising of the latter arm rotates the shaft E, and thereby the drawer-operating mechanism, (in a manner to be hereinafter described,) causing the drawer to open, the action of which rotates the shaft F', and thereby the said releasing-arms $F^2$ thereon, as just described. Thus it will be seen that when the shaft F' is rotated and all of the arms J, carrying the retaining projection $k$, are raised by the action of the releasing-arms $F^2$ from engagement with said notched arms $h^9$ the latter are still locked by the projection $e^3$, with the exception of the one or more raised from contact therewith by the depressed key or keys of the series operated, thus allowing one or more wheels or series of tablets to be operated without interfering with the others. Journaled on the shaft $J'$ are arms $j$, provided with friction-rollers at the free end thereof adapted to engage with the teeth of said registering-wheels by means of a spring $j'$ to act as a brake to prevent the same from being carried too far forward by their momentum. The shaft E, adapted to be operated by the rods B and arms E', as hereinbefore described, is provided at one end thereof with an arm $e^4$, rigidly secured thereto, (see Fig. 2,) adapted when raised (by the action of the shaft E, as described) to engage with a pivoted device $m$, located on one end of a rod M, which latter at its opposite end is pivoted to the frame A' to lift said rod, and thereby a pivoted hook or catch $M^2$, from engagement with a recess $b^4$ in the money-drawer through the medium of a connecting-rod M'. The drawer being thus released is thrown open by the action of an arm $m'$ of a pivoted spring-actuated device $M^3$ upon a roller $b^5$, secured to said drawer. (See Fig. 2.) An arm $m^2$ of said device $M^3$ is connected to the shaft F' through the medium of connecting-rods $m^3$ and $m^4$, and when the money-drawer is thrown open in a manner as described the arm $m^2$ is depressed, (by the action of the spring $M^4$,) thus rotating said shaft F' backward by means of said connecting-rods $m^3$ and $m^4$ to raise the releasing-arms $F^2$ thereon to engage the retaining projection $k$ on the arm J (see Fig. 5) to raise the latter, and thereby release the quadrant and allow the same and the connecting parts to operate in a manner as hereinbefore described. On the said shaft F' (referring to Figs. 1 and 6) a segment N is rigidly secured, provided with a cam-groove $n$ therein, into which a projection $p'$, having a roller thereon and located on an arm $p$ of the shaft P, extends and is engaged thereby to operate said shaft P. Loosely journaled on the latter shaft are frames or supports P', (a detail front view of one being shown in Fig. 7,) which, in connection with the several parts supported by the same, form the numeral carrying mechanism. Said frames or supports are provided at the ends of their arms $p^2$ with pawls $p^3$, adapted at their free ends to engage the teeth of the registering-wheels F and be moved forward to carry said registering-wheels one space (when the said frames or supports are released from their normal locked position by retaining arms or catches $r$, as will hereinafter be described) by means of coiled springs $p^4$, which latter at one end connect with the said arm $p^2$ or extension thereof of the frame or support P', and at their opposite end connect with the end or curved arms $p^5$, projecting from the shaft P, and adapted to operate in a manner as follows: The said registering-wheels F are provided on one side thereof, near their outer periphery, with four pins or projections $f^2$, located thereon at equal distances apart, and are so arranged that when the wheel has made a quarter of a revolution and the figure 0 thereon appears under the openings in the plate G one of the said pins or projections $f^2$ engages with an extension $r'$ of said notched arms or catches $r$ (see Fig. 6) to raise the latter from engagement with a lug or arm $p^6$ of the said frame or support P' (said notched arms being held in said engagement by means of coiled springs bearing with a downward pressure on the same) to release the latter and allow the pawl $p^3$, supported thereby, to carry the wheel at the left of the one operated forward one space or number, caused by the tension of the coiled spring $p^4$, when the arm $p^5$ is raised by the action of the shaft P at the closing of the drawer through the medium of connecting mechanism, as hereinbefore described, and the arm $p^2$ of said frame or support carrying the pawl $p^3$ is provided with a projection or arm $p^8$, forming a stop device adapted to engage with the teeth on the registering-wheels at every forward action of the carrying-pawl $p^3$ to prevent said wheels from being carried forward more than one space or number. When the drawer is opened and the shaft F' and segment N thereon are rotated toward the front of the machine by means as hereinbefore described, the upper edge of the groove $n$ in said segment engaging with the end of the arm $p$ or the roller $p'$ thereon depresses the same, and thereby rotates the shaft P, serving to lower the arms $p^5$ thereon and cause the rear side of the same to contact or engage with the frames or supports P' to move the same back to their normal position, which action retracts the pawl $p^3$ and arm $p^8$, supported thereby, backward in position for engagement with the preceding tooth of the registering-wheel and the arm or lug $p^6$ into engagement with the notch in its retaining-arm $r$. By means of this lowering or depressing of the arms $p^5$ to throw the carrying mechanism back to its normal position the tension on the springs $p^4$ has been taken away, and the said arm or lug $p^6$ of the frame P' is loosely retained by its arm or catch $r$ in such a manner that when one of the pins $f^2$ on the operated registering-wheel engages the rear extension $r'$ of the arm or catch $r$ to raise the latter from engagement with the said lug or arm $p^6$ to allow the latter to be released therefrom the said lug or arm $p^6$ would remain stationary, there being no outward tension on the same, owing to the relaxation of tension on the spring $p^4$, as described, and the arm or catch $r$ would re-engage with said lug or arm and hold the carrying-pawl $p^3$ stationary when the drawer is closed and a tension given to the springs $p^4$, for the purpose hereinbefore described. Now to prevent this I provide a pawl $n$ on said segment N, which at its free end projects slightly beyond the edge of the segment at a point at which, when the roller $p'$ located on the arm $p$ reaches, the carrying mechanism has been thrown back to its normal position as described; but the shaft F' (and segment thereon) has not quite completed its rotation, and therefore the releasing-arms F'² have not yet released the arms $h^9$ to allow the quadrant to be moved or rotated and operate the registering-wheel, and as the said shaft and segment complete their action the end of the said arm $p$ or the roller $p'$ thereon is carried over the said projecting end of the pawl $n$ by the action of the spring $p^9$, which action is sufficient to rotate the shaft P enough in the opposite direction to raise the arms $p^5$ sufficiently to give the springs $p^4$ a slight tension to exert sufficient outward or forward pressure on the arm or lug $p^6$ against its retaining arm or catch $r$, so that when one of the pins $f^2$ on the registering-wheel (which latter are released and rotated after the shaft F' has completed its rotation) engages the extension $r'$ of said retaining arm or catch $r$ to raise the latter, the arm or lug $p^6$ is thrown slightly forward and out of position for re-engagement by said retaining arm or catch $r$; and when the drawer is closed and the shaft P is rotated back to its normal position the arms $p^5$ thereon are raised, thereby producing a tension on the spring $p^4$ to carry the pawl $p^3$, and thereby the registering-wheel, forward one space or numeral. Referring to Fig. 14, I have shown a somewhat different and slightly-modified means for operating the shaft P and carrying mechanism supported thereon from that hereinbefore described. In this instance, in lieu of the segment N, I provide a segment (represented at S) adapted to be secured on the shaft F' and provided with two projecting arms or extensions $s\ s$, as clearly shown, adapted to engage the roller $p'$ on the arm $p$ of the shaft P to operate or rotate the latter sufficiently to properly operate the arms $p^5$ thereon, and in lieu of the combination of the spring $p^9$ and pawl $n$ to operate the frame or supports P' in a manner as described I provide a spring $p^{10}$, which is secured at its lower end to the said frame or support P', as shown, and at its upper end presses against the outer end of the said retaining arm or catch $r$ when the latter is in its normal locked position in a manner to spring under the same when raised by the engagement of one of the projections $f^2$ on the registering-wheels with its rear extension and hold the same in its raised position from engagement with the arm or lug $p^6$ to allow the carrying-pawl $p^3$ to be carried forward at the closing of the drawer in a manner as hereinbefore described.

In order that the operation of the machine as a whole may be more readily understood, we will explain briefly as follows:

After a sale has been made the person making the sale, in order to place the proceeds of the same in the drawer of the machine must first depress one or more of the keys (according to amount of sale) provided with numerals forming the required amount, the action of which raises the rod or rods B, supporting correspondingly-numbered tablets, and brings the latter into view through the openings in the case, which are there held in their raised position by the pawls D engaging projections $b'$ on rods B, and the elevating of the rods B raises the arm E', thereby rotating the shaft E to release the drawer from its locked position and allow the same to be thrown open by the action of the arm $m'$ of the device M³ and the spring M⁴, which action rotates the registering-wheel supporting shaft F' through the medium of connecting-rods in a manner to raise the releasing-arms F² thereon to engage with and raise the arms J, to release the retaining-pins $k$ thereon from engagement with the notched arms $h^3$, and allow those of the latter which are released from contact with the engaging-roller $e^3$ on the arm or arms E' (the latter being raised by the elevated tablet-supporting rod or rods B, as described) to be freed and enable the quadrant or quadrants $h'$ to be moved or rotated forward by the action of springs I until engaged by projections $b^2$ on the raised rod B, and at the time the shaft F' is rotated to operate the mechanism to release the quadrant from its locked position, as described, the pin $f'$ on said shaft, engaging the pivoted plate $h^4$, is moved from engagement with the latter (which engagement serves to wind up or give the proper tension to the spring I) to allow the pawl $h^6$ to engage the teeth of the registering-wheel and move or operate the same simultaneously with the action of the quadrant; and in case the proceeds to be deposited is of a sufficient amount to bring the carrying mechanism into operation one of the pins or projections $f^2$, located on the registering-wheel, (operated by the action of the quadrant, as described,) engages with the rear extension of the retaining-arm $r$ to release the latter from engagement with the frame or support P', in order that when the drawer is closed (it being understood that when the shaft F' was rotated by the opening of the drawer to produce the results as described the shaft P has been rotated by means as described and lowered the ends of the arms $p^5$ thereon, thereby reducing the tension on the coiled springs $p^4$ connected thereto) and the shaft P is rotated back to its normal position, thus raising the arms $p^5$, the tension of the springs $p^4$ connected thereto carries the wheel at the left of the one operated by the pawl $h^6$ forward one space or numeral by means of the pawl $p^3$, the wheel being prevented from being carried forward more than one space by means of the stop device or arm $p^8$, projecting from the frame or support P', engaging with the teeth of the wheel at the forward action of the pawl $p^3$, as will be readily understood. When the drawer is closed, as mentioned, the roller $b^5$ thereon engages the arm $m'$ of the device M³ and pushes the same in, thereby raising the arm $m^2$ of said device, which serves to rotate the shaft F' back to its normal position, thereby lowering the releasing-arms F² from engagement with the arms J (see Fig. 4) and moving the pins or projections $f$ thereon into engagement with the pivoted plates $h^4$ (see Fig. 10) to throw the pawls $h^6$ from engagement with the teeth of the registering-wheel and wind up the springs I and move the quadrant back to its normal position and the notched arms $h^9$ into position for engagement with the retaining projection $k$. The lever C³ is then depressed to engage and raise the arm D² of the pawl-supporting shaft D' to throw the pawls D from engagement with the raised rods B, to release the latter, and allow the same and the tablets supported thereon to drop back to their normal position. I have also provided the machine at the end opposite that shown in Fig. 2 with a pivoted spring-actuated arm (not illustrated in the drawings) similar in construction and function (partly) to the device M³, (shown in Fig: 2,) and adapted to act upon the opposite end of the drawer in unison with the latter to throw the drawer out evenly, as will appear obvious. The device located at said opposite end of the machine has no connection with any other part of the mechanism, however, its function being merely to assist in throwing out the drawer when released. I also provide a bell at the said opposite end of the machine, which is struck, when the drawer is opened, by a pivoted bell-hammer, the lower end of which is engaged by the drawer when the latter is opened.

In order to prevent any fraudulent or dishonest working with the machine that might be done by allowing the money-drawer to only partially open or close and thereby prevent the registering mechanism from operating, as it is obvious from the foregoing description that the drawer should travel a certain distance when moved either in or out, for the proper operation of the registering mechanism, I provide a plate T, pivoted at one end to the side of the drawer and provided with a pin or projection $t$ at or near its opposite end, which is adapted to ride upon the top of a rod or lever U, pivoted within a recess in the side of the case A when the drawer is being thrown open, and when the drawer is fully opened the free end of the plate T falls below the pivoted end of the rod or lever U, and the pin or projection $t$ thereon passes beneath said rod or lever U; but in case the drawer is not fully opened and the operator attempts to close the same the pin or projection $t$ will ride back upon the rod or lever U until it engages with a notch $u$ thereon, as clearly shown in Fig. 2, and, on the other hand, in case the drawer is not fully closed said pin or projection $t$ engages a notch $n$ on the under side of the rod or lever U. By this means it will be readily understood that the operator is obliged to fully open or close the drawer to enable the same to be operated.

Having thus set forth my invention, what I claim as new, and desire to secure by Letters Patent of the United States, is—

1. In a cash register and indicator, the combination of an oscillating shaft carrying the registering-wheels and provided with a segment located thereon provided with two engaging arms or surfaces, and a secondary shaft supporting the "carrying mechanism," so called, provided with an arm or projection adapted to be engaged by the engaging arms or surfaces of said oscillating segment to operate its supporting-shaft, substantially as described, and for the purpose set forth.

2. In a cash register and indicator, the combination, with the registering-wheels, supporting-shaft, and operating mechanism, of a segment located on said supporting-shaft, provided with a cam-groove therein, the latter adapted to act upon an arm or extension of the shaft supporting the carrying mechanism to operate the latter, substantially as described, and for the purpose set forth.

3. In a cash register and indicator, the combination, with a supporting-shaft and registering-wheels loosely journaled thereon, and a secondary shaft provided with a frame or support loosely journaled thereon, the latter being provided with a pawl adapted to engage with teeth on said registering-wheels, of a segment secured on said supporting-shaft, provided with a cam-groove therein adapted to engage with an arm or extension of said secondary shaft to operate the latter, and thereby said frame or support and connected parts, substantially as described, and for the purpose set forth.

4. In a cash register and indicator, the combination, with the registering-wheels and supporting-shaft, of a secondary shaft operated by the latter, and a frame or support loosely journaled thereon, provided with a carrying-pawl and a stop or catch for engagement with said registering-wheels, substantially as and for the purpose set forth.

5. In a cash register and indicator, the combination, with the registering-wheels provided with teeth, of a frame or support loosely journaled on a supporting-shaft and provided with a carrying-pawl and a stop device adapted to engage with the teeth of said wheels at certain intervals, and a notched arm or catch for engagement with said frame or support to adjustably hold the pawl and stop device thereon in a normal position from engagement with said wheels, substantially as and for the purpose set forth.

6. The combination, in a cash register and indicator, with the registering-wheels and supporting-shaft, of a secondary shaft and a frame loosely journaled thereon provided with a carrying-pawl and a stop device adapted to engage with said registering-wheels, substantially as set forth, a retaining arm or catch for adjustably holding said frame in a normal stationary position, and a spring connecting with said frame or part thereof, adapted to carry the pawl supported by the latter, and thereby the registering-wheel, forward when the frame is released by said retaining-arm, substantially as described, and for the purpose set forth.

7. In a cash register and indicator, the combination, with the registering-wheels provided with four pins or projections arranged at equal distances thereon, a secondary shaft and operating mechanism, a frame supported on said secondary shaft, provided with a carrying and a stop device for engagement with said registering-wheels, and a retaining arm or catch for holding said frame stationary, adapted to be operated upon by one of the pins or projections on the registering-wheels to release the same from engagement with the said frame to allow the carrying device thereon to move the registering-wheel, substantially as described, and for the purpose set forth.

8. In a cash register and indicator, the combination, with the registering-wheels provided with teeth on one side thereof, of a shaft and operating mechanism, said shaft supporting the carrying mechanism, consisting in part of a frame provided with a carrying-pawl for engagement with the teeth on said registering-wheel, a spring for moving said pawl forward, and an arm or extension on said shaft for moving said pawl backward for engagement with the preceding tooth, substantially as described, and for the purpose set forth.

9. The combination, in a cash register and indicator, with a shaft provided with a segment having a cam-groove therein, of a secondary shaft provided with an arm or extension having a friction-roller at or near its free end thereof extending within the said cam-groove, the action of which, in combination with a spring, as set forth, operates the said arm or extension and thereby its supporting-shaft, substantially as described, and for the purpose set forth.

10. In a cash register and indicator, the combination, with the registering-wheels and their supporting-shaft provided with a segment N thereon, of a secondary shaft supporting the carrying mechanism thereon and provided with an arm or extension having connection at or near its free end with a coiled spring and adapted to be operated upon by the segment N and a pawl $n^2$ thereon, substantially as described, and for the purpose set forth.

11. The combination, in a cash register and indicator, of the vertical (tablet-supporting) sliding rods provided with projections thereon, pivoted key-levers adapted at their free end to engage said projections on the sliding rods, pawls loosely journaled on a supporting-rod adapted to engage said sliding rods when raised, and a pivoted lever adapted to engage an arm of said supporting-rod to operate the latter and the pawls thereon in one direction, and springs to operate said pawls in the opposite direction, in a manner substantially as described, and for the purpose set forth.

12. In a cash register and indicator, the combination, with the registering-wheels, supporting-shaft, and segment located on said shaft, of a secondary shaft provided with an arm thereon adapted to be engaged by said segment to operate said secondary shaft, a frame loosely journaled on said secondary shaft forming a part of and supporting the "carrying mechanism," so called, a retaining arm or catch for adjustably engaging with and holding said frame in a stationary position, and a spring to support said retaining-arm in a position from engagement with said frame, substantially as and for the purpose set forth.

WILLIAM H. WYTHE.
WILLIAM W. WYTHE.

Witnesses:
  FREDERICK EGNER,
  JOSEPH M. CRANE.